United States Patent
Jugel et al.

(10) Patent No.: US 10,261,956 B2
(45) Date of Patent: Apr. 16, 2019

(54) PIXEL-AWARE QUERY REWRITING

(71) Applicants: Uwe Jugel, Dresden (DE); Zbigniew Jerzak, Dresden (DE); Eric Peukert, Dresden (DE)

(72) Inventors: Uwe Jugel, Dresden (DE); Zbigniew Jerzak, Dresden (DE); Eric Peukert, Dresden (DE)

(73) Assignee: SAP SE, Walldorf (DE)

( * ) Notice: Subject to any disclaimer, the term of this patent is extended or adjusted under 35 U.S.C. 154(b) by 596 days.

(21) Appl. No.: 14/289,421

(22) Filed: May 28, 2014

(65) Prior Publication Data

US 2015/0347528 A1    Dec. 3, 2015

(51) Int. Cl.
*G06F 7/00* (2006.01)
*G06F 16/248* (2019.01)
*G06F 16/2453* (2019.01)

(52) U.S. Cl.
CPC ...... *G06F 16/248* (2019.01); *G06F 16/24534* (2019.01); *G06F 16/24535* (2019.01)

(58) Field of Classification Search
CPC ......... G06F 17/30554; G06F 17/30448; G06F 17/30451; G06F 16/248; G06F 16/24534; G06F 16/24535
USPC ....................................................... 707/759
See application file for complete search history.

(56) References Cited

U.S. PATENT DOCUMENTS 5,966,139 A * 10/1999 Anupam ............... G06T 3/0012
                                                    345/428
2006/0221077 A1* 10/2006 Wright ............. G06F 17/30554
                                                    345/428

OTHER PUBLICATIONS

Battle et al., "Dynamic Reduction of Query Result Sets for Interactive Visualization", 2013, IEEE, 8 pages.*
Wickham, Hadley, "Bin-Summarise-smooth: A framework for visualizing large data", Oct. 2013, 9 pages (Year: 2013).*
Muigg et al., "A Four-level Focus+Context Approach to Interactive Visual Analysis of Temporal Features in Large Scientific Data", 2008, Blackwell Publishing, 8 pages. (Year: 2008).*

(Continued)

*Primary Examiner* — Alex Gofman
*Assistant Examiner* — Michael Le
(74) *Attorney, Agent, or Firm* — Klarquist Sparkman, LLP

(57) ABSTRACT

A query rewriter associated with a database management system or visualization client rewrites a database query based on properties, characteristics, etc. of the visualization to be rendered by the visualization client. For example, the query rewriter receives an initial query and one or more visualization parameters (such as width, height and/or type of visualization) for the visualization client. The query rewriter rewrites the initial query based on the visualization parameter(s), so as to produce a data-reducing query, and then outputs the data-reducing query for execution. The query rewriter can selectively rewrite the initial query depending on size of query results of the initial query. In some example implementations, the query rewriting models a process of rasterization of geometric primitives by the visualization client, so as to facilitate error-free visualization. In many cases, the query rewriter significantly reduces the volume of query results while facilitating fast interaction with the visualization.

20 Claims, 10 Drawing Sheets

(56) References Cited

OTHER PUBLICATIONS

Keogh et al., "A Simple Dimensionality Reduction Technique for Fast Similarity Search in Large Time Series Databases", 2000, Dept. of Information and Computer Science University of California, Irvine, 12 pages. (Year: 2000).*
Burtini et al., "Time Series Compression for Adaptive Chart Generation", 2013, IEEE, 6 pages. (Year: 2013).*
Agarwal et al., "Blink and It's Done: Interactive Queries on Very Large Data," *Proc. of the VLDB Endowment*, vol. 5, 4 pp. (Aug. 2012).
Bresenham, "Algorithm for Computer Control of a Digital Plotter," *IBM Systems Journal*, vol. 4, No. 1, pp. 25-30 (1965).
Burtini et al., "Time Series Compression for Adaptive Chart Generation," *IEEE Canadian Conf. on Electrical and Computer Engineering*, 6 pp. (May 2013).
Eick et al., "Visual Scalability," NISS Technical Report No. 106, 28 pp. (Jun. 2000).
Esling et al., "Time-Series Data Mining," *ACM Computing Surveys*, vol. 45, No. 1, 34 pp. (Nov. 2012).
Färber et al., "SAP HANA Database—Data Management for Modern Business Applications," *SIGMOD Record*, vol. 40, No. 4, pp. 45-51 (Dec. 2011).
Fu, "A Review on Time Series Data Mining," *Engineering Applications of Artificial Intelligence*, vol. 24, No. 1, pp. 164-181 (2011).
Heer et al., "Interactive Dynamics for Visual Analysis," *Communications of the ACM*, vol. 55, No. 4, pp. 45-54 (Apr. 2012).
Hershberger et al., "Speeding Up the Douglas_Peucker Line-Simplification Algorithm," *Proc. $5^{th}$ Int'l Symp. on Spatial Data Handling*, pp. 134-143 (1992).
Jerzak et al., "The DEBS 2012 Grand Challenge," *Proc. of the $6^{th}$ACM Int'l Conf. on Distributed Event-Based Systems*, 6 pp. (Jul. 2012).
Keim et al., "Pushing the Limit in Visual Data Exploration: Techniques and Applications," *Lecture Notes in Artificial Intelligence*, pp. 37-51 (2003).
Keogh et al., "A Simple Dimensionality Reduction Technique for Fast Similarity Search in Large Time Series Databases," *Proc. Pacific-Asia Conf. on Knowledge Discovery and Data Mining*, pp. 122-133 (2000).
Kolesnikov, "Efficient Algorithms for Vectorization and Polygonal Approximation," Academic Dissertation, University of Joensuu, 85 pp. (2003).
Kumar et al., "Time-Series Bitmaps: A Practical Visualization Tool for Working with Large Time Series Databases," *SIAM Data Mining Conf.*, 13 pp. (Apr. 2005).

Lindstrom et al., "Fast and Efficient Compression of Floating-Point Data," *IEEE Trans. on Visualization and Computer Graphics*, vol. 12, No. 5, pp. 1245-1250 (Sep. 2006).
Ma et al., "A Framework for Adaptive Content Delivery in Heterogeneous Network Environments, " *Proc. SPIE, Multimedia Computing and Networking*, vol. 3969, pp. 86-100 (2000).
Mutschler et al., "The DEBS 2013 Grand Challenge," *Proc. of the $7^{th}$ACM Int'l Conf. on Distributed Event-Based Systems*, 6 pp. (Jun. 2013).
Office of Electricity Delivery & Energy Reliability, "Smart Grid," 5 pp., downloaded from http://energy.gov/oe/technology-development/smart-grid (Jan. 2014).
Shi et al., "Performance Evaluation of Line Simplification Algorithms for Vector Generalization," *The Cartographic Journal*, vol. 43, No. 1, pp. 27-44 (Mar. 2006).
Shneiderman, "Extreme Visualization: Squeezing a Billion Records into a Million Pixels," *Proc. of the 2008 ACM SIGMOD international conference on Management of Data*, 10 pp. (Jun. 2008).
Wang et al., "Image Quality Assessment: From Error Visibility to Structural Similarity," *IEEE Trans. on Image Processing*, vol. 13, No. 4, pp. 600-612 (Apr. 2004).
Wesley et al., "An Analytic Data Engine for Visualization in Tableau," *Proc. of the 2011 ACM SIGMOD Int'l Conf. on Management of Data*, pp. 1185-1194 (Jun. 2011).
Wu et al., "A Comparison of DFT and DWT Based Similarity Search in Timeseries Databases," *ACM $9^{th}$Int'l Conf. on Information and Knowledge Management*, pp. 488-495 (Nov. 2000).
Chen et al., "Approximate Line Scan—Conversion and Antialiasing," *Computer Graphics Forum*, pp. 69-78 (1999).
Douglas et al., "Algorithms for the Reduction of the Number of Points Required to Represent a Digitized Line or its Caricature," *Cartographica Journal*, vol. 10, No. 2, pp. 112-122 (1973).
Eick et al., "Visual Scalability," *Journal of Computational and Graphical Statistics*, vol. 11, No. 1, pp. 22-43 (2002).
Fu et al., "Representing Financial Time Series Based on Data Point Importance," *Engineering Applications of Artificial Intelligence*, vol. 21, No. 2, pp. 277-300 (2008).
Przymus et al., "Recursive Query Facilities in Relational Databases: A Survey," *Database Theory and Application, Bio Science and Bio-Technology Communications in Computer and Information Science*, vol. 118, pp. 89-99 (2010).
Reumann et al., "Optimizing Curve Segmentation in Computer Graphics," *Proc. of the Int'l Computing Symp.*, pp. 467-472 (1974).
Visvalingam et al., "Line Generalisation by Repeated Elimination of Points," *The Cartographic Journal*, vol. 30, No. 1, pp. 46-51 (1993).

* cited by examiner software 180 implementing one or more innovations
for pixel-aware query rewriting

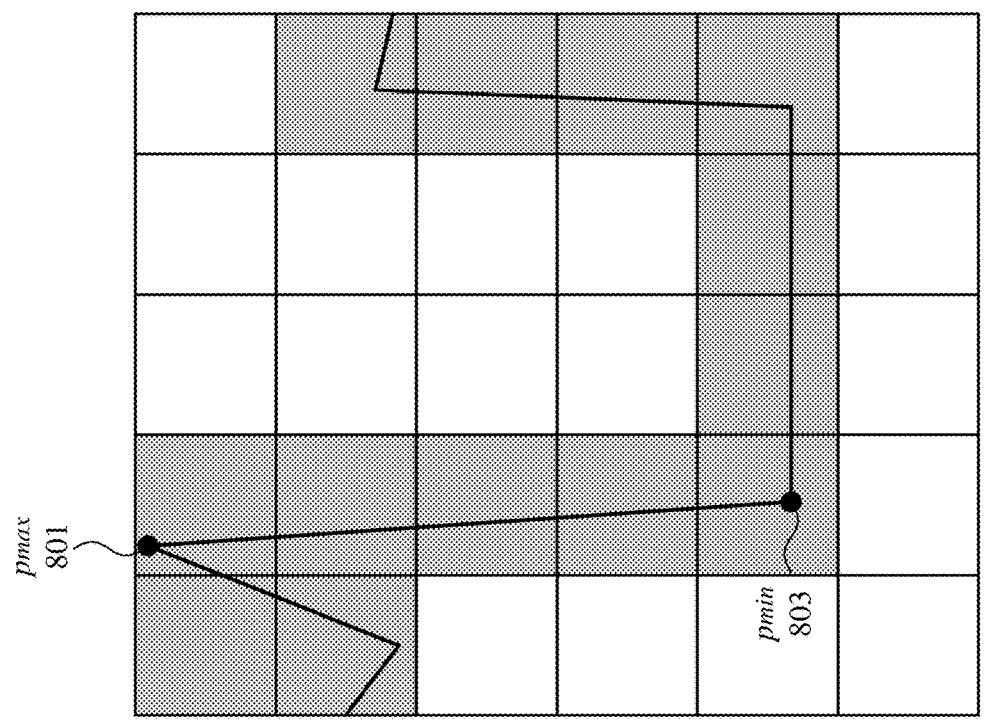

Figure 9a    901

```
SELECT t,v FROM Q JOIN
(SELECT round($w*(t-$t1)/($t2-$t1)) as k,        -- define key
     min(v) as v_min, max(v) as v_max             -- get min,max
     FROM Q GROUP BY k) as QA                     -- group by k
ON k = round($w*(t-$t1)/($t2-$t1))                -- join on k
     AND (v = v_min OR v = v_max)                 -- &(min|max)
```

Figure 9b    902

```
SELECT t,v FROM Q JOIN
(SELECT round($w*(t-$t1)/($t2-$t1)) as k,        ---define key
     min(v) as v_min, max(v) as v_max,            --get min,max
     min(t) as t_min, max(t) as t_max             --get 1st,last
     FROM Q GROUP BY k) as QA                     --group by k
ON k = round($w*(t-$t1)/($t2-$t1))                --join on k
     AND (v = v_min OR v = v_max OR               --&(min|max|
          t = t_min OR t = t_max)                 --  1st|last)
```

Figure 9c    903

```
WITH Q as <time series T(t,v) based on arbitrary query>
SELECT avg(t) as t, avg(v) as v FROM Q            --avg. tuple
GROUP BY round($w*(t-$t1)/($t2-$t1)),             --horiz. grouping
         round($h*(v-$v1)/($v2-$v1))              --vert. grouping
UNION SELECT t,v FROM Q JOIN                      --union G2D + M4
(SELECT round($w*(t-$t1)/($t2-$t1)) as k,         --horiz. key
        min(t) as t_min, max(t) as t_max          --get 1st,last
        min(v) as v_min, max(v) as v_max,         --get min,max
        FROM Q GROUP BY k) as QA                  --group by k
ON k = round($w*(t-$t1)/($t2-$t1))                --join on k
     AND (t = t_min OR t = t_max OR               --&(1st|last
          v = v_min OR v = v_max)                 --  |min|max)
```

```
WITH Q as (SELECT t,v FROM sensors                          -- original query
           WHERE id = 1 AND t >= $t1 AND t <= $t2),
     QC as (SELECT count(*) c FROM Q)                       -- cardinality computation
SELECT * FROM Q WHERE (SELECT c FROM C) <= (4*$w)           -- conditional execution I/II
UNION
SELECT * FROM (
    SELECT t,v FROM Q JOIN                                  -- START M4 data reduction query
    SELECT round($w*(t-$t1)/($t2-$t1)) as k,                -- using visualization parameters
           min(v) as v_min, max(v) as v_max,                -- This M4 query models the
           min(t) as t_min, max(t) as t_max                 -- process of line rendering
           FROM Q GROUP BY k) as QA                         -- by selecting each group's
ON k = round($w*(t-$t1)/($t2-$t1))                          -- four extreme tuples
   AND (v = v_min OR v = v_max OR
        t = t_min OR t = t_max)                             -- END M4 data reduction query
) as QD WHERE (SELECT c FROM C) > (4*$w)                    -- conditional execution II/II
```

PIXEL-AWARE QUERY REWRITING

FIELD

Query processing for a database management system.

BACKGROUND

Computing systems store vast amounts of time-series data such as measurements from sensor networks or utility systems (e.g., smart grids), price and volume information from financial markets, statistics about sports terms, players, or employees, and so on. Often, time-series data is stored in a relational database or other database. In general, a database is an organized collection of data. A relational database, conceptually, can be organized as one or more tables, where a table is a two-dimensional structure with data values organized in rows and columns. A database management system ("DBMS") mediates interactions between a database, users and applications in order to organize, create, update, capture, analyze and otherwise manage the data in the database.

In some scenarios, millions of readings from high-frequency sensors or outputs are stored in a database, to be accessed later using a visual data-analysis tool. A visual data-analysis tool (or other "visualization client") presents time-series data stored in a database. Typically, a data analyst views and interacts with visualizations of the time-series data presented by the visualization client. The visualization client transforms user input from the analyst into queries issued to the DBMS managing the database that holds the time-series data. Such visual analysis of high-volume time-series data is common in many areas, including finance, banking, manufacturing, sports analytics, and utility monitoring. Depending on the volume of time-series data and number of users accessing the database, the volume of time-series data transferred from the DBMS to visualization clients can potentially be very large.

For example, suppose a database stores time-series data for measurements from sensors embedded in manufacturing machinery. The reporting frequency for a given embedded sensor is 100 Hz. Typically, an engineer accesses time-series data that spans the last 12 hours for a given sensor. A visualization client can use a non-aggregating structured query language ("SQL") query to retrieve the requested data from the DBMS (e.g., SELECT time, value FROM sensor WHERE time>NOW( )−12*3600), where 12*3600 is the number of seconds in the last 12 hours. In common usage scenarios, 100 engineers from around the world may simultaneously access the database. In this case, the total amount of data to transfer is 100×(12×3600) seconds×100 Hz=432 million sensor measurement values, including 4.32 million values per data-analysis tool/engineer. Assuming a wire size of 60 bytes per value, the total amount of data that is transferred is over 24 GB, or over 247 MB per visualization client or engineer. An engineer will have to wait for this data to be loaded and processed by the visualization client before that engineer can examine a visualization for the time-series data for the sensor.

Many conventional visual data-analysis tools provide flexible and direct access to time-series data, but issue queries to a DBMS without considering the size, or cardinality, of the data set that is requested. This can lead to very high bandwidth consumption for query results between a data-analysis tool and DBMS, causing high latency between the issuance of queries and the return of the query results. Such delay hinders interactive visualization, especially for high-volume time-series data.

Even if a user has a network connection with sufficient bandwidth, the processing or memory requirements for high-volume time-series data can overwhelm a visual data-analysis tool. For example, a data-analysis tool may redundantly store copies of data as tool-internal objects, using a significant amount of system memory per record. This can cause long wait times for a user, leaving them with an unresponsive visualization client or even impairing an operating system or other software if system memory is exhausted.

Other systems lower the volume of data transferred from a DBMS to a visualization client by creating, at the DBMS side, an image or other graphical summary of requested time-series data, and transferring the image/graphic to the visualization client. This disregards the semantics of the visualization and typically results in degraded interactivity and/or visual errors at the visualization client.

SUMMARY

In summary, the detailed description presents innovations in the area of query rewriting for a database management system ("DBMS"). For example, a query rewriter associated with a DBMS or visualization client can rewrite a query based on properties, characteristics, etc. of the visualization to be rendered by the visualization client. In many instances, the query rewriter significantly reduces the volume of query results by focusing the data-reducing database query on values that would affect rendering in the visualization of the initial database query. Such visualization-driven query rewriting can result in error-free visualization of the query results of the data-reducing database query, compared to visualization of query results of the initial database query, while facilitating fast interaction with the visualization and providing actual data values for inspection of query results.

According to one aspect of the innovations described herein, a query rewriter receives an initial database query and one or more visualization parameters for a visualization client. For example, the visualization parameter(s) include width, height and/or type of visualization. The query rewriter rewrites at least part of the initial database query based on the visualization parameter(s), so as to produce a data-reducing database query, and then outputs the data-reducing database query for execution. In some example implementations, when it changes a database query (e.g., by adding visualization-oriented data aggregation operators), the query rewriting models a process of rasterization of geometric primitives by the visualization client, so as to facilitate error-free visualization that uses actual data values.

For example, the rewriting uses an aggregation operator to reduce data requested with the initial database query. The aggregation operator selects data points to be used for visualization of a result set at the visualization client. The aggregation operator can be an averaging aggregation operator, a min-max aggregation operator, a min-max-last-first aggregation operator (a so-called M4 operator, as explained below), or some other operator.

For some types of visualization, the query rewriter determines columns or rows for a canvas area (of the visualization client) and adjusts the initial database query to request (with the data-reducing query) a set of tuples per column or row for the canvas area. Each of the columns or rows can be a pixel column/pixel row. Or, each of the columns or rows can include n-pixel columns/pixel rows, where n≥2. For example, when the data-reducing database query requests tuples for time-series data to be rendered in a line chart, the set of tuples per column/row is (1) a tuple having a maximum value in a range associated with the column/row, (2) a tuple having a minimum value in the range, (3) a tuple having a first timestamp in the range, and (4) a tuple having a last timestamp in the range. Or, as another example, when the data-reducing database query requests tuples for time-series data to be rendered in a bar chart, the set of tuples per column/row is (1) a tuple having a maximum value in a range associated with the column/row.

For another type of visualization, the query rewriter can determine a resolution for a canvas area (of the visualization client) and adjust the initial database query to request (with the data-reducing query) a tuple per set of one or more pixels for the canvas area. For example, when the data-reducing database query requests tuples for time-series data to be rendered in a scatter plot, the tuple per set of pixel(s) is a tuple having an average value in a range associated with the set of pixel(s).

The query rewriter can adjust the initial database query to request (with the data-reducing query) tuples for multiple types of visualization concurrently. For example, the data-reducing database query can request tuples for time-series data to be rendered in a scatter plot and in a line chart.

The query rewriter can selectively rewrite an initial database query. For example, the query rewriter compares a size of a result set for the initial database query to a size limit. The query rewriter rewrites the initial database query if the size of the result set exceeds the size limit. The size limit can depend, for example, on the visualization parameter(s), computational capacity of a computing system that runs the visualization client and/or network bandwidth.

According to another aspect of the innovations described herein, a computing system implements a query rewriting tool. The computing system includes memory adapted to buffer an initial database query as well as memory adapted to buffer one or more visualization parameters for a visualization client. A module of the computing system is adapted to rewrite at least part of the initial database query based on the visualization parameter(s), so as to produce a data-reducing database query. The computing system also includes memory adapted to buffer the data-reducing database query for output. The computing system can be a server of a DBMS (e.g., the query rewriting tool can be part of the DBMS). Or, the computing system can also implement the visualization client (e.g., the query rewriting tool can be part of a client of a DBMS).

More generally, the innovations for query rewriting can be implemented as part of a method, as part of a computing system adapted to perform the method or as part of a tangible computer-readable media storing computer-executable instructions for causing a computing system to perform the method. The various innovations can be used in combination or separately.

The foregoing and other objects, features, and advantages of the invention will become more apparent from the following detailed description, which proceeds with reference to the accompanying figures.

BRIEF DESCRIPTION OF THE DRAWINGS

FIGS. 8a-8c are diagrams illustrating a line chart rendered in different ways.

FIGS. 9a-9c are code listings illustrating example data-reducing SQL queries, and FIG. 9d is a code listing illustrating an example SQL query for selective query rewriting.

DETAILED DESCRIPTION

The detailed description presents innovations in the area of query rewriting for a database management system ("DBMS"). For example, a query rewriter selectively rewrites a query based on properties, characteristics, etc. of the visualization to be rendered by a visualization client. The query rewriter can be located with a DBMS or located with the client. In many instances, the query rewriter significantly reduces the volume of query results by focusing a data-reducing database query on values that would affect rendering in the visualization of the initial database query, while facilitating fast interaction with an error-free visualization of the query results.

I. Example Computing Systems and Cloud Computing Environments.

Figure 1:
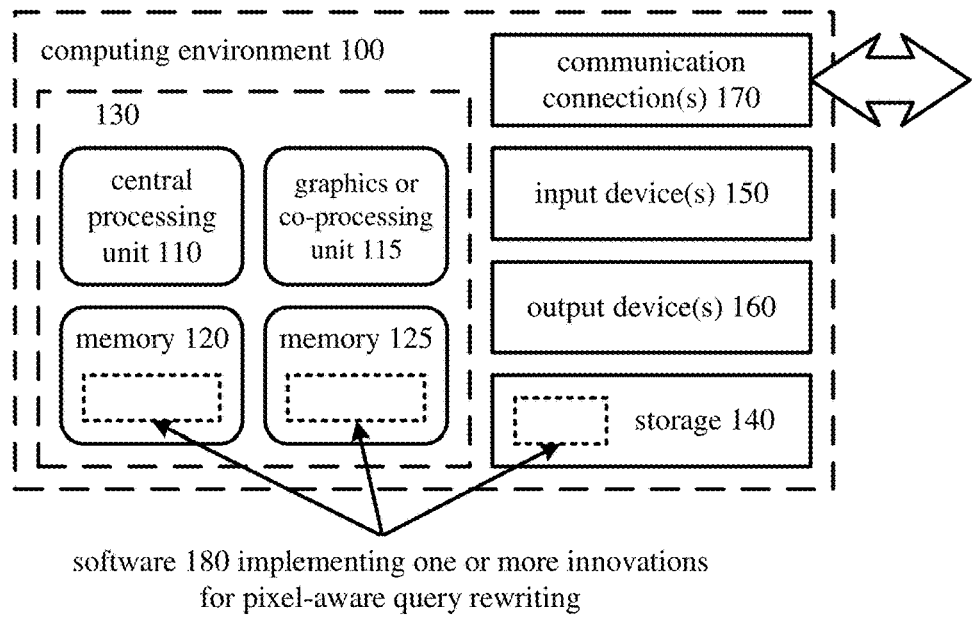
FIG. 1 is a diagram illustrating an example computing system in which some described embodiments can be implemented.

FIG. 1 depicts a generalized example of a suitable computing system (100) in which the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). In FIG. 1, this basic configuration (130) is included within a dashed line. The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a CPU (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for pixel-aware query rewriting, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information in a non-transitory way and which can be accessed within the computing system (100). The storage (140) stores instructions for the software (180) implementing one or more innovations for pixel-aware query rewriting.

The input device(s) (150) may be a touch input device such as a keyboard, mouse, pen, or trackball, a voice input device, a scanning device, or another device that provides input to the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, or other carrier.

Figure 2:
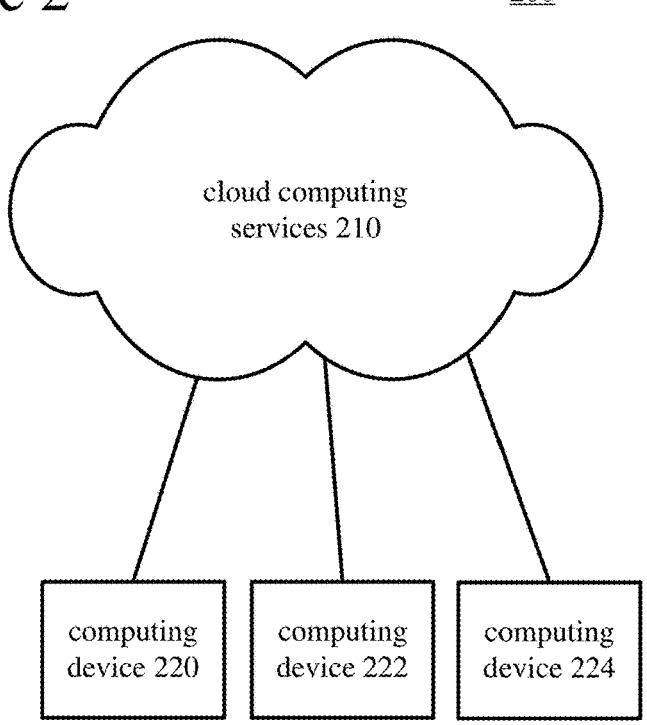
FIG. 2 is a diagram illustrating an example cloud computing environment in which some described embodiments can be implemented.

FIG. 2 depicts an example cloud computing environment (200) in which described innovations can be implemented. The cloud computing environment (200) includes cloud computing services (210). The cloud computing services (210) can include various types of cloud computing resources, such as computer servers, data storage repositories, networking resources, etc. The cloud computing services (210) can be centrally located (e.g., provided by a data center of a business or organization) or distributed (e.g., provided by various computing resources located at different locations, such as different data centers and/or located in different cities or countries).

The cloud computing services (210) are utilized by various types of computing devices (e.g., client computing devices), such as computing devices (220, 222, and 224). For example, the computing devices (e.g., 220, 222, and 224) can be computers (e.g., desktop or laptop computers), mobile devices (e.g., tablet computers or smart phones), or other types of computing devices. For example, the computing devices (e.g., 220, 222, and 224) can utilize the cloud computing services (210) to perform computing operations (e.g., data processing, data storage, and the like).

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). The computer-executable instructions may be interpreted instructions, which are converted to another form of instructions at runtime, or instructions directly executable by a processor. Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 1, computer-readable storage media include memory (120 and 125) and storage (140). The term computer-readable storage media does not include signals and carrier waves. In addition, the term computer-readable storage media does not include communication connections (e.g., 170).

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Database queries can be written in SQL or another query language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

II. Example Network Environments for Query Processing.

Figure 3:
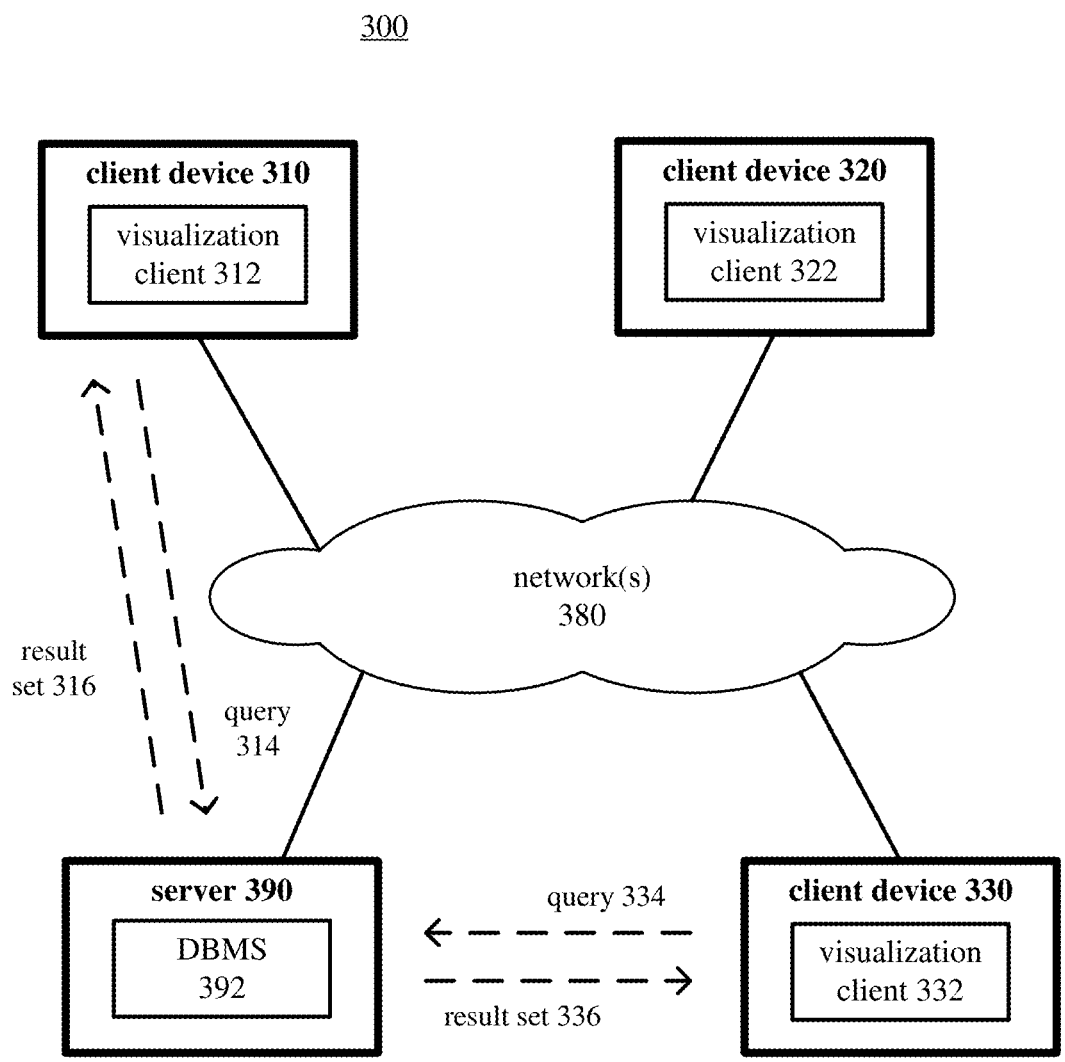
FIG. 3 is a diagram illustrating an example network environment that includes a server and client devices that interact for query processing.

FIG. 3 illustrates an example network environment (300) that includes a server (390), three client devices (310, 320, 330) and a network (380). The network (380) represents the Internet, a wide-area network, a local-area network or any other network. In FIG. 3, the server (390) interacts with the three client devices (310, 320, 330) over the network (380) for query processing.

The server (390) hosts a database management system ("DBMS") (392). The DBMS (392) mediates interactions between a database and clients in order to organize, create, update, capture, analyze and otherwise manage the data in a database. The DBMS (392) can be a relational DBMS ("RDBMS") such as a SAP HANA RDBMS, another in-memory RDBMS, a Postgres DBMS, another object-relational DBMS or some other type of DBMS. Although FIG. 3 shows a single server (390), in practice the DBMS (392) can manage multiple servers across which data for a database is partitioned. The data can be high-volume time-series data, or another type of data, for finance, banking, manufacturing, sports analytics, utility monitoring or some other application area. In some configurations, the server (390) can incorporate a query rewriter, as described in the next section.

Each of the client devices (310, 320, 330) includes a visualization client (312, 322, 332). A visualization client (312, 322, 332) presents data (such as time-series data) stored in the database managed by the DBMS (390) or another DBMS. A client device (310, 320, 330) can also include other software for creating, deleting, editing or otherwise managing with data in the database. Although FIG. 3 shows three client devices (310, 320, 330), alternatively, the network environment can include more or fewer client devices. In some configurations, a client device (310, 320, 330) can incorporate a query rewriter, as described in the next section.

A data analyst can view and interact with visualizations of data presented by a visualization client (312, 322, 332). The visualization client (312, 322, 332) transforms user input from an analyst into one or more queries issued to the DBMS (390), which are conveyed through the network (380). A query can be written in SQL or some other query language. In the example of FIG. 3, a visualization client (312, 332) issues a query (314, 334) through the network (380) to the DBMS (390), which processes the query and returns a result set (316, 336) through the network (380) to the visualization client (312, 332) that issued the query (314, 334). The visualization client (312, 322, 332) then renders a visualization of the set of query results.

III. Example Query Rewriting Tools.

When query results are rendered by a visual data-analysis tool on a display, the visualization is inherently restricted to displaying the retrieved data using width×height pixels of a canvas area of the display. This implies that the visual data-analysis tool performs some form of data reduction before rendering—transforming and projecting the received set of query results onto a width×height view. In many conventional visual data-analysis tools, such data reduction by the visual data-analysis tool for rendering is performed regardless of the size of the set of query results. In other words, all query results are provided to the visual data-analysis tool and rendered, even if the canvas area is much too small to meaningfully depict the full range or details of the query results.

This section describes example implementations of query rewriters that apply data reduction operators at the query level (as opposed to data reduction at the rendering stage). By rewriting a visualization-related query using a data reduction operator, a query rewriter can create a query that produces a much smaller query result set when the rewritten query is executed by a DBMS. This can significantly reduce data volume for sets of query results, thereby avoiding high network bandwidth requirements and leading to shorter wait times for the users of visual data-analysis tools (or other visualization clients). At the same time, by considering one or more visualization parameters of a visualization client that will render a query result set, the query rewriter can craft a data-reducing database query such that the quality of the visualization of the query results is not impaired when rendered by the visualization client. Further, when the data-reducing database query yields a subset of the original set of query results, a user of the visualization client can interact with actual data for the query results (as opposed to a static image of the query results).

Figure 4:
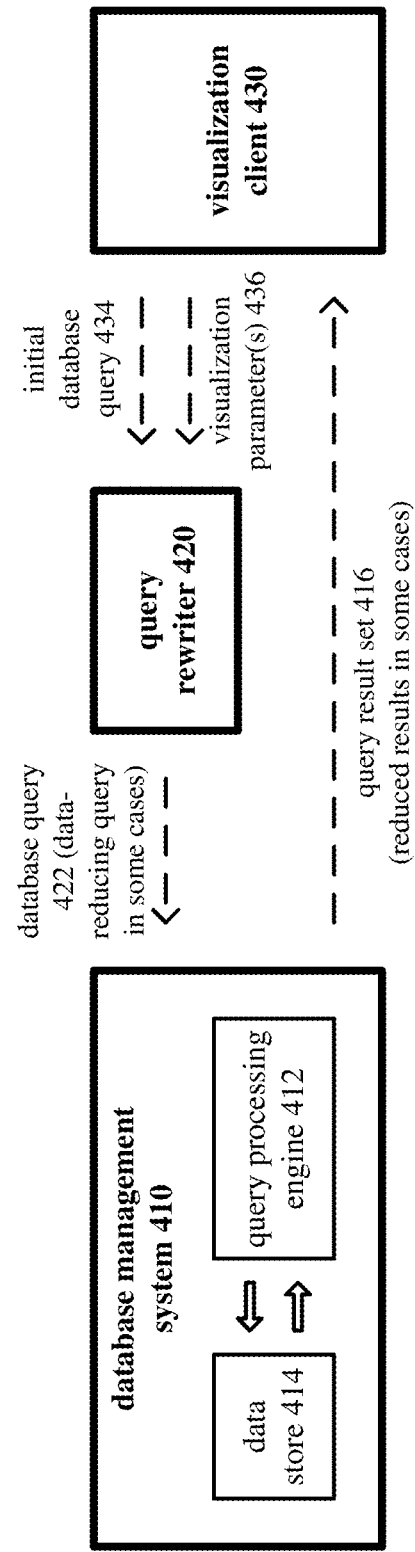
FIG. 4 is a diagram illustrating an example architecture that includes a DBMS, query rewriter and visualization client.

FIG. 4 illustrates an example architecture (400) that includes a DBMS (410), a query rewriting tool ("query rewriter") (420) and a visualization client (430). The architecture (400) generically supports visualization-driven query rewriting, regardless of the type of visualization client or data source. In some example implementations, the query rewriting is driven by visualization parameters for the visualization client (430) and is not influenced by the time granularity of the data or the volume of the data.

The visualization client (430) provides an initial database query (434) to the query rewriter (420). The initial database query (434) can be written in SQL or some other query language. In some example implementations, the visualization client (430) defines the initial database query (434) for time-series data. A user or application selects a time-series data source and time range. The user or application can also select the type of visualization that will be performed, or the visualization client (430) can always render the same type of visualization. The selected data source and time range typically define the main parts of the initial database query (434). For example, the initial database query (434) has the form SELECT time, value FROM series WHERE time>$t_1$ AND time<$t_2$, with $t_1$ and $t_2$ defining the time range for the initial database query (434). More generally, the visualization client (430) can define an arbitrary relational query for the initial database query (434), so long as the result is a valid time-series relation.

Time-series data can be represented as a relation T(t, v) with two numeric attributes t and v, where t and v are real numbers. More generally, any relation that has at least two numeric attributes can be projected to this model. For example, given a relation X(a, b, c), where a is a numeric timestamp and b and c are numeric values, two separate time-series relations can be derived by means of projection and renaming, i.e., $T_b(t, v)=\pi_{t\leftarrow a,v\leftarrow b}(X)$, and $T_c(t, v)=\pi_{t\leftarrow a,v\leftarrow c}(X)$. Thus, a time series with two value attributes can be represented by two separate time series with a shared time axis in visualization (two aligned time series).

The visualization client (430) also provides one or more visualization parameters (436) to the query rewriter (420). The visualization parameter(s) (436) can be (a) width of display (that is, canvas area for visualization) of the visualization client (430), (b) width and height of the display of the visualization client (430), (c) width and height of the display of the visualization client along with a type of visualization, or (d) some other combination of one or more visualization parameters for the visualization client (430).

Figure 5:
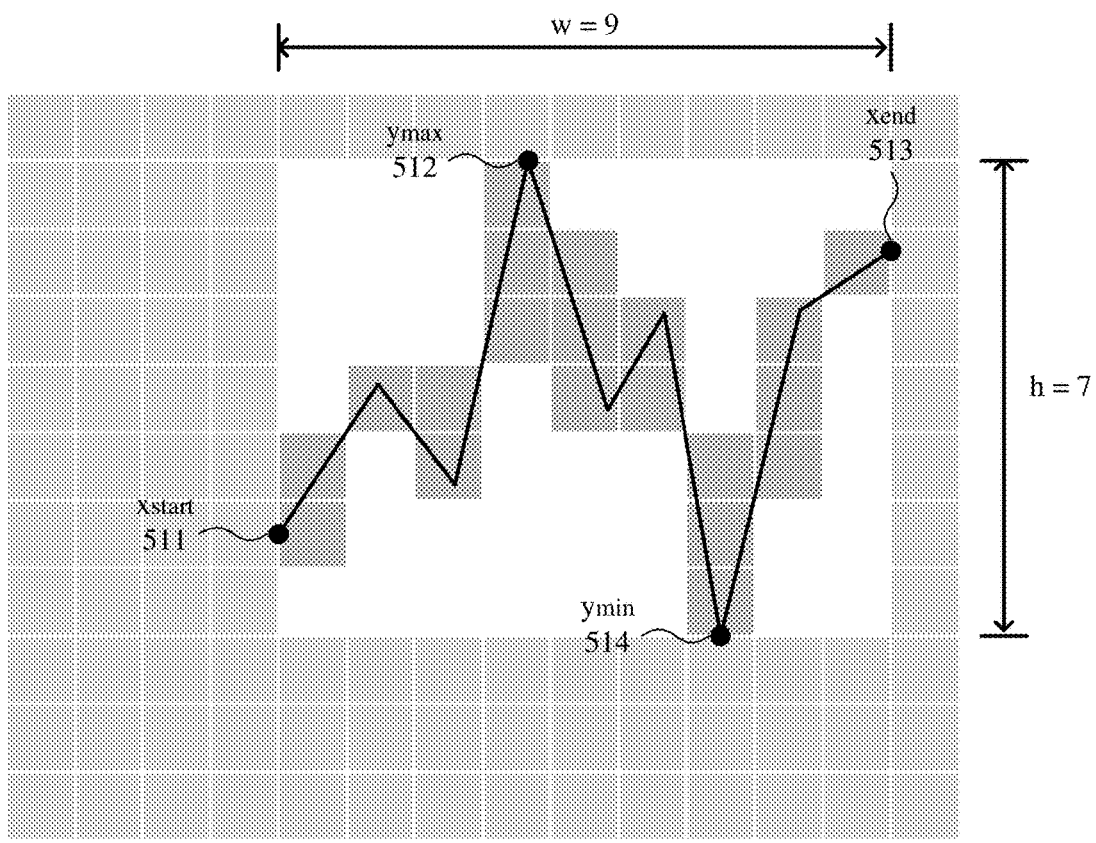
FIG. 5 is a diagram illustrating an example display area for a visualization client.

For many types of visualization, during rendering, drawing routines of the visualization client can derive discrete pixel values for points of data. In general, the visualization parameter(s) (436) indicate characteristics of the rendering process by the visualization client (430). For example, suppose the visualization client (430) provides values of parameters for a width w and height h for the pixel resolution of visualization. The values of w and h indicate the actual resolution (w×h) of the canvas area that is used for rasterization of geometry. (The width w and height h of the canvas area may be different than the overall display area used by the visualization, as shown in the display area (500) of FIG. 5. In FIG. 5, the dimensions of the canvas area are w=9 and h=7, but the overall display area (500) occupies 14×11 pixels. The area outside the canvas area can be labels and/or padding space.) When the query rewriter (420) derives data reduction operators from the visualization parameters w and h, the query rewriter (420) makes decisions consistent with the rendering operations of the visualization client (430).

For example, suppose that, during rendering, the visualization client (430) can use the geometric transformation functions $f_x(t)$ and $f_y(v)$ to project a timestamp-value pair (t, v) from time-series data T(t, v) to real numbers x and y in the coordinate system of the canvas area for visualization.

$$x=f_x(t)=w\cdot(t-t_{start})/(t_{end}-t_{start}) \quad (1),$$

and $$y=f_y(v)=h\cdot(v-v_{min})/(v_{max}-v_{min}) \quad (2),$$

where $t_{start}$ represents the earliest timestamp, $t_{end}$ represents the latest timestamp, $v_{min}$ represents the smallest value and $v_{max}$ represents the largest value, in a set of query results. The canvas area for visualization closely crops the time-series data to be rendered. The projected smallest and largest timestamps align with the left and right boundaries of the canvas area, respectively. In FIG. 5, the projected smallest and largest timestamps align with the real-valued left boundary $x_{start}$ (511) and right boundary $x_{end}$ (513), respectively. The projected smallest and largest values align with the top and bottom boundaries of the canvas area, respectively. In FIG. 5, the projected smallest and largest values align with the real-valued top boundary $y_{max}$ (512) and bottom boundary $y_{min}$ (514), respectively. (The visualization client is assumed to not apply additional vertical or horizontal translation or re-scaling operations for rendering, which facilitates pixel-level accuracy for data reduction operators.)

Memory accessible to the query rewriter (420) buffers the initial database query (434). Memory accessible to the query rewriter (420) also buffers the visualization parameter(s) (436). The query rewriter (420) receives the initial database query (434) and the visualization parameter(s) (436). The query rewriter (420) can rewrite at least part of the initial database query (434) based on the visualization parameter(s) (436), so as to produce a database query (422). Memory accessible to the query rewriter (420) buffers the database query (422) for output.

The database query (422) can be a data-reducing version of the initial database query (434). In general, to produce the database query (422), the query rewriter (420) can adjust the initial database query (434) to select data points to be used by the visualization client (430) for correct visualization of the set of (unreduced) results of the initial database query (434). The way the query rewriter (420) adjusts the initial database query (434) can depend on (a) size of the set of query results (e.g., to rewrite queries that will result in large sets of query results, but not rewrite other queries), (b) display characteristics (e.g., width and/or height of canvas area) for the visualization client (430), and/or (c) the type of visualization (e.g., line chart, bar graph, scatter plot) that will be rendered by the visualization client (430). The query rewriter (420) can use different aggregation operators (such as relational operators) that aggregate or reduce data in different ways for the database query (422). For example, as detailed below, the aggregation operator can be an averaging aggregation operator, a min-max aggregation operator, or a min-max-last-first (M4) aggregation operator. Alternatively, the aggregation operator can be some other operator.

Query rewriting (and execution of data-reducing database queries) imposes some overhead. If small queries are common, the cost of overhead processing for query rewriting and execution of data-reducing database queries can outweigh the benefits of data reduction. Therefore, in some example implementations, the query rewriter (420) selectively rewrites an initial database query (434) if its size exceeds a certain size limit. The size can be measured in terms of the cardinality of the set of query results that would be yielded from execution of the initial database query (434). In many cases, the query rewriter (420) can reuse the results of sub-queries when measuring the size of the set of query results of the initial database query (434) (e.g., via common table expression, as defined by the SQL 1999 standard). Typically, the time it takes to measure size for results of the initial database query (434) is negligibly small, compared to the execution time of the initial database query (434). A single rewritten query $Q_R$ can include the initial database query (434) and a data-reducing database query (422), as well as a condition for selecting between the initial database query (434) and data-reducing database query (422). For example, the rewritten query $Q_R$ includes the following sub-queries:

1) the original query Q (example of initial database query (434)),
2) a cardinality check $Q_C$ on Q, and
3) a workload query (example of query (422)) that, based on the outcome of $Q_C$, either
   a) uses the result of Q directly, or
   b) executes an additional data reduction $Q_D$ on Q.

Thus, conditional execution for the rewritten query $Q_R$ is modeled using a union of the different sub-queries 3a and 3b, which have contradictory predicates based on the size limit. This allows the query logic to be executed only once—the execution of the original query Q and the data-reducing query $Q_D$ are covered by the single rewritten query $Q_R$. (As such, no high-volume data needs to be copied to an additional data reduction or compression component.) Various examples of a rewritten query $Q_R$ are presented below.

The DBMS (410) receives the database query (422) and executes it using a query processing engine (412). The query processing engine (412) is, for example, a generic query processing engine, but it performs data reduction when processing a data-reducing database query, as defined by the operators of the query. According to the terms of the database query (422), the query processing engine (412) requests specific data from the data store (414). The data can be high-volume time-series data, or another type of data, for finance, banking, manufacturing, sports analytics, utility monitoring or some other application area. The data store (414) provides the requested data to the query processing engine (412). Alternatively, the DBMS (410) can include a generic query processing engine for normal query processing and a dedicated data reduction engine for processing data-reducing queries.

The DBMS (410) formats the returned data as the query result set (416), which is output to the visualization client (430). The DBMS (410) can be a RDBMS such as a SAP HANA RDBMS, another in-memory RDBMS, a Postgres DBMS, another object-relational DBMS or some other type of DBMS.

Depending on implementation, the DBMS (410), query rewriter (420) or visualization client (430) can be hosted in different configurations of computing systems. Communication of an initial database query (434), visualization parameter(s) (436), database query (422) or query result set (416) over a network can use a remote procedure call to a procedure of an interface, remote messaging, or some other form of communication across a network. Communication of an initial database query (434), visualization parameter(s) (436) or database query (422) within a computing system can use inter-process communication, method calls across an interface or any other form of communication within the computing system. Within a computing system, an initial database query (434), visualization parameter(s) (436) or database query (422) can be passed by value or passed by reference.

For example, a client device can host both the visualization client (430) and the query rewriter (420). In this case, the initial database query (434) and visualization parameter(s) (436) are communicated from the visualization client (430) to the query rewriter (420) using some form of communication within the client device. The query rewriter (420) communicates the query (422) to the DBMS (410) over a network, and the query result set (416) is returned over a network. Alternatively, a single application or other software program can incorporate the visualization client (430) and the query rewriter (420), directly performing the query rewriting to produce the database query (422).

Or, as another example, a server can host both the query rewriter (420) and the DBMS (410). In this case, the initial database query (434) and visualization parameter(s) (436) are communicated from the visualization client (430) to the query rewriter (420) over a network. The query rewriter (420) communicates the query (422) to the DBMS (410) using some form of communication within the server. The query result set (416) is returned over a network. Alternatively, a single application or other software program can incorporate the query rewriter (420) and the DBMS (410).

Or, as another example, the visualization client (430), query rewriter (420) and DBMS (410) can be hosted by different computing systems. In this case, the initial database query (434) and visualization parameter(s) (436) are communicated from the visualization client (430) to the query rewriter (420) over a network. The query rewriter (420) communicates the query (422) to the DBMS (410) over a network, and the query result set (416) is returned over a network.

In any case, data reduction happens when the query (422) is executed by the query processing engine (412) for the database. This saves network bandwidth (either between the visualization client (430) (with query rewriter (420)) and a server or between backend components (i.e., server and database)) at the expense of database-internal query execution time, often resulting in faster end-to-end query response times for visualization-related queries. In some scenarios, by applying data reduction operators at the query level, the query rewriter (420) trades off a few milliseconds of additional query execution time for dozens of seconds of reduction of data transfer time, while facilitating near real-time visualization of millions of data points. For the visualization client (430), execution time, processing requirements and memory requirements for can dramatically decrease, due to the data reduction defined by the query. And, when the query rewriter (420) is outside the visualization client (430), software for the visualization client (430) need not be changed, since the rewriting of the initial database query (434) happens outside the visualization client (430) and the query result set (416) is organized like a conventional set of query results.

IV. Example Techniques for Pixel-Aware Query Rewriting.

Figure 6:
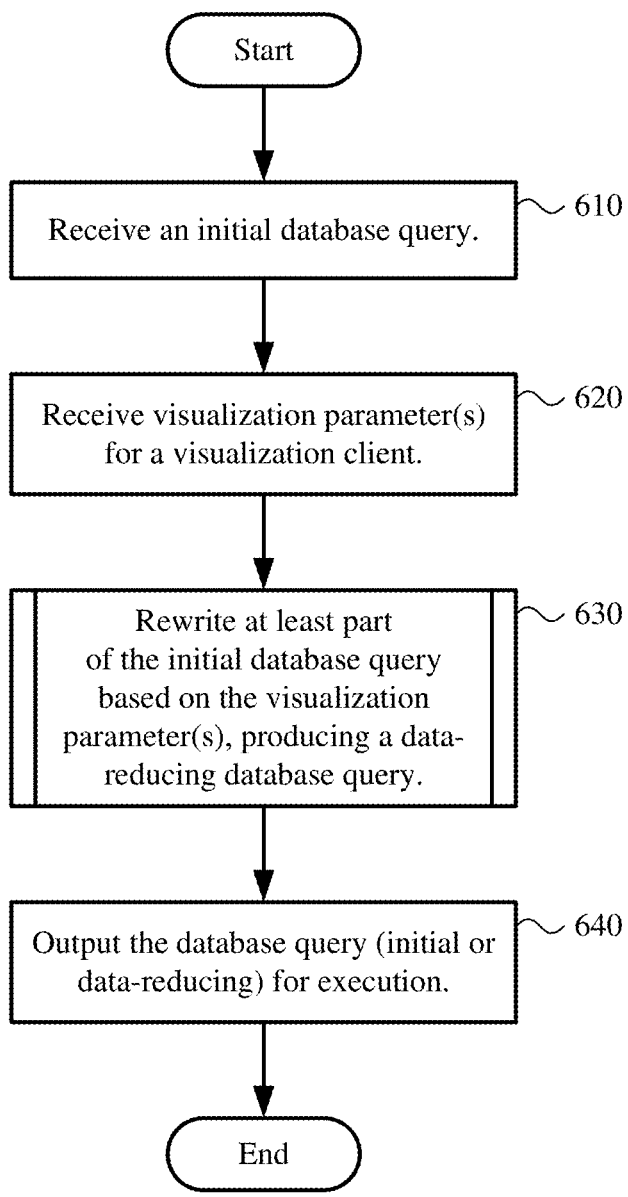
FIG. 6 is a flowchart illustrating a generalized technique for pixel-aware query rewriting.

FIG. 6 is a flowchart illustrating a generalized technique (600) for pixel-aware query rewriting. A query rewriter such as one described with reference to FIG. 4 can perform the technique (600).

To start, the query rewriter receives (610) an initial database query and receives (620) one or more visualization parameters for a visualization client. For example, the visualization parameter(s) include width, height and/or type of visualization. Alternatively, the visualization parameter(s) include other and/or additional parameters.

The query rewriter rewrites (630) at least part of the initial database query based on the visualization parameter(s), so as to produce a data-reducing database query. For example, the query rewriter uses an aggregation operator that reduces data requested with the initial database query. The aggregation operator selects data points to be used for visualization of a result set at the visualization client. The aggregation operator can be an averaging aggregation operator, a min-max aggregation operator, a min-max-last-first (M4) aggregation operator, or some other operator. In some example implementations, when it changes a database query (e.g., by adding visualization-oriented data aggregation operators), the query rewriting models a process of rasterization of geometric primitives by the visualization client, so as to facilitate error-free visualization that uses actual data values. (That is, the new query "models" the process of rasterization in that the new query is an (approximating) instruction for the DBMS that informs the DBMS how to "simulate" the process of rasterization.) The query rewriter outputs (640) the data-reducing database query for execution.

For some types of visualization, the query rewriter determines columns or rows for a canvas area of the visualization client, and then adjusts the initial database query to request (with the data-reducing query) a set of tuples per column or row for the canvas area. (If tuples along a horizontal axis are grouped, the query rewriter adjusts a query so that it requests a set of tuples per column of the canvas area. On the other hand, if tuples along a vertical axis are grouped, the query rewriter adjusts a query so that it requests a set of tuples per row of the canvas area.) Each of the columns (or rows) can be a single pixel column (or row). Or, each of the columns (or rows) can include n-pixel columns (or rows), where n≥2. For example, when the data-reducing database query requests tuples for time-series data to be rendered in a line chart, the set of tuples per column/row is (1) a tuple having a maximum value in a range associated with the column/row, (2) a tuple having a minimum value in the range, (3) a tuple having a first (earliest) timestamp in the range, and (4) a tuple having a last timestamp in the range, where such tuples are returned if present in the range. Or, as another example, when the data-reducing database query requests tuples for time-series data to be rendered in a bar chart, the set of tuples per column/row is (1) a tuple having a maximum value in a range associated with the column/row, where such tuple is returned if present in the range. Alternatively, the set of tuples per column/row is some other set of one or more tuples for the column/row.

For another type of visualization, the query rewriter can determine a resolution for a canvas area of the visualization client, and then adjust the initial database query to request (with the data-reducing query) a tuple per set of one or more pixels for the canvas area. For example, when the data-reducing database query requests tuples for time-series data to be rendered in a scatter plot, the tuple per set of pixel(s) is a tuple having an average value in a range associated with the set of pixel(s), where such tuple is returned if present in the range. Alternatively, the set of tuples per set of pixel(s) is some other set of one or more tuples for the set of pixel(s).

The query rewriter can adjust the initial database query to request (with the data-reducing query) tuples for multiple types of visualization concurrently. For example, the data-reducing database query can request tuples for time-series data to be rendered in a scatter plot and rendered in a line chart.

Figure 7:
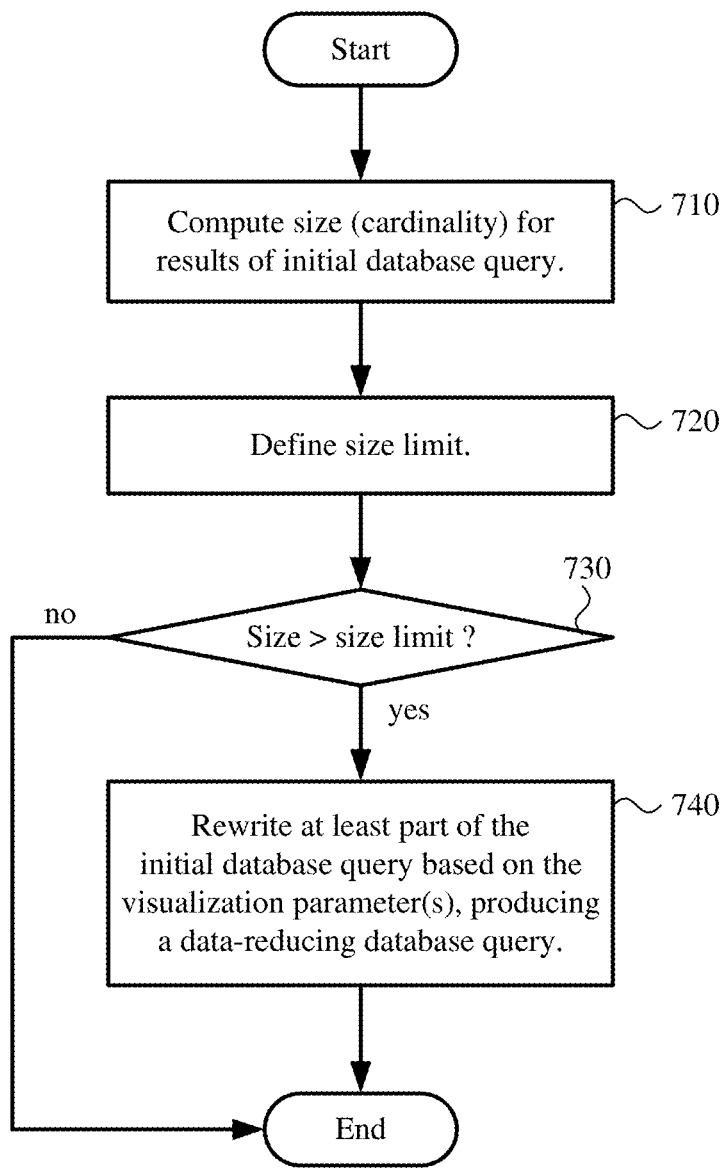
FIG. 7 is a flowchart illustrating an example technique for deciding whether to rewrite a query.

The query rewriter can automatically rewrite (630) any initial database query that it receives based on visualization parameter(s). Or, the query rewriter can selectively rewrite (630) the initial database query. FIG. 7 is a flowchart illustrating an example technique (700) for deciding whether to rewrite an initial database query.

To start, the query rewriter computes (710) the size (cardinality) for results of the initial database query. Specifically, the size/cardinality is the size/cardinality of the set of query results of the initial database query.

The query rewriter also defines (720) a size limit. The size limit depends on implementation. The size limit can depend on the visualization parameter(s), computational capacity of a computing system that runs the visualization client, network bandwidth and/or another factor. For example, for time-series data to be rendered as a line chart for error-free visualization in some example implementations, the size limit is 4×w, where w is the width of a canvas area of a visualization client. As another example, for time-series data to be rendered as a scatter plot for error-free visualization in some example implementations, the size limit is w×h, where w and h are the width and height of a canvas area of a visualization client.

The query rewriter compares (730) the size of the result set for the initial database query to the size limit. If the size of the result set (for the initial database query) exceeds the size limit, the query rewriter rewrites (740) the initial database query based on the visualization parameter(s), producing a data-reducing database query. Otherwise (the size of the result set does not exceed the size limit), the initial database query is unchanged. Alternatively, the query rewriter checks another condition when selectively rewriting an initial database query.

The query rewriter can repeat the technique (600) on a query-by-query basis.

V. Example Implementations of Data Reduction Operators for Query Rewriting.

A line chart that is based on a reduced data set will omit lines that would have connected not-selected tuples, and it will add a new approximating line to bridge a gap (over the not-selected tuples) between two consecutive selected tuples. The resulting errors in the real-valued visualization space (due to missing lines and false lines) may be significantly reduced by the final discretization process of the drawing routines at a visualization client. For other types of visualization, errors in real-valued visualization space are similarly reduced when rendering the visualization with discrete pixel values.

This section describes example implementations of data reduction operators in a query rewriter. The data reduction operators can be used for query rewriting in a variety of visualization clients that use a DBMS (e.g., RDBMS) as a data source. The data source can provide high-volume time-series data in the area of finance, banking, manufacturing, sports analytics, utility monitoring or another domain. In these example implementations, the query rewriter rewrites queries to use aggregation-based time-series dimensionality reduction at the database query level, and may facilitate error-free visualization at high data-reduction rates. In some cases, visualization-oriented data aggregation can reduce data volume by up to two orders of magnitude and reduce latency by one order of magnitude, while preserving perfect visualization.

A. Example Types of Visualization and their Characteristics.

In many of the examples in this section, a visualization client renders line charts representing high-volume time-series data. In other examples, the visualization client renders another type of visualization to represent high-volume time-series data. For example, the visualization client renders a scatter plot, bar chart or space-filling visualization representing high-volume time-series data. In a line chart or scatter plot, a single data point can be presented using only a few pixels (or even a single pixel). In a bar chart, a bar width of one or more pixels can represent values at a given timestamp or range of timestamps. In a space-filling visualization, the brightness of a pixel (or set of multiple pixels) indicates a value, and pixels are filled in a raster scan pattern (e.g., left-to-right then top-to-bottom, or top-to-bottom then left-to-right). In general, the way that a query rewriter changes an initial database query to reduce the volume of data in the set of query results depends on the type of visualization that will be rendered.

To render a scatter plot in a w×h area, a visualization client can shift, scale and round time-series data T(t, v) to a relation of discrete pixels V(x, y), with x∈[1, w] and y∈[1, h]. For a scatter plot, a small marker placed in the w×h area occupies one pixel or several neighboring pixels. A scatter plot can display up to $n_{max}$=w×h distinct data points, with a data point per pixel. When rewriting an initial database query for visualization as a scatter plot, the query rewriter can adjust the query to select at least one data point per pixel, where a pixel represents a value (or range of values) at a given timestamp (or range of timestamps). For example, to achieve data reduction, the query rewriter can adjust the query to group the timestamps into w groups and group the values into h groups, resulting in one group (for a combination of w value and h value) per pixel. For such grouping in 2D space for data reduction (with a "G2D" aggregation operator), the query rewriter can then adjust the query to request the average time and value per group, or request the average value and minimum time per group, or request some other combination of time and value per group, yielding a time-series relation with up to w×h tuples, and resulting in transfer of up to $n_{max}$=w×h distinct data points from the database to the visualization client (depending on how many tuples are returned for the query). For a high-resolution display, the w×h distinct data points can still include hundreds of thousand of tuples, which limits potential data reduction.

Rendering a space-filling visualization is similar to rendering a scatter plot. To render a space-filling visualization in a w×h area, a visualization client can project time-series data T(t, v) to a sequence of discrete values V(i, l), with i is the position in the sequence (for i∈[1, w×h]) and l is the luminance value to be used (for l∈[0,255] or another range). A space-filling visualization can display up to $n_{max}$=w×h distinct data points, with a data point per pixel.

For a bar chart, a bar for a time span can start at the top or bottom of a w×h canvas area and reach the maximum value for that time span. Such a bar chart can display up to $n_{max}$=w distinct data points in the canvas area, with a data point per pixel column. For example, the query rewriter can adjust the query to group the timestamps into w groups, resulting in bars that each have the width of a single pixel. Multiple values per pixel column (that is, per time span) are over-plotted by the maximum-value bar. For such maximum value data reduction (with a "max" aggregation operator), the query rewriter can adjust the query to request the maximum value per group (per time span), resulting in transfer of up to $n_{max}$=w distinct data points from the database to the visualization client (depending on how many tuples are returned for the query).

For a line chart, a straight line segment connects two consecutive tuples of the underlying time-series relation. For visualization with a line chart that may have errors (compared to rendering of all data points of an initial database query), a line chart can display the tuple with the minimum value and the tuple with the maximum value per pixel column (per time span) of a w×h canvas area. Such a line chart can display up to $n_{max}$=2×w data points in the canvas area, with two data points per column of pixels. For such minimum value and maximum value data reduction ("min+max" aggregation operator), the query rewriter can adjust the query to request the minimum value and maximum value per group (per time span), resulting in transfer of up to $n_{max}$=2×w distinct data points from the database to the visualization client (depending on how many tuples are returned for the query).

For error-free visualization with a line chart (compared to rendering of all data points of an initial database query), a line chart can display up to four distinctly visible, non-ambiguous data points per pixel column (per time span) of the w×h canvas area. Such a line chart can display up to $n_{max}$=4×w data points in the canvas area, with four data points per pixel column. For example, to achieve data reduction, the query rewriter can adjust the query to group the timestamps into w groups, resulting in one group per pixel column. For four-tuple per column data reduction ("M4" aggregation operator), the query rewriter can adjust the query to request the tuple with the first timestamp, the tuple with the last timestamp, the tuple with the minimum value and the tuple with the maximum value per pixel column, resulting in transfer of up to $n_{max}$=4×w distinct data points from the database to the visualization client (depending on how many tuples are returned for the query). Compared to scatter plots and space-filling visualization, line charts can potentially have greater data reduction for high-resolution displays ($n_{max}$=4×w versus $n_{max}$=w×h). Also, no matter how big T(t, v) is, selecting the correct 4×w tuples from it with the M4 aggregation operator allows the visualization client to create an error-free line chart visualization of T(t, v).

Figure 8B:
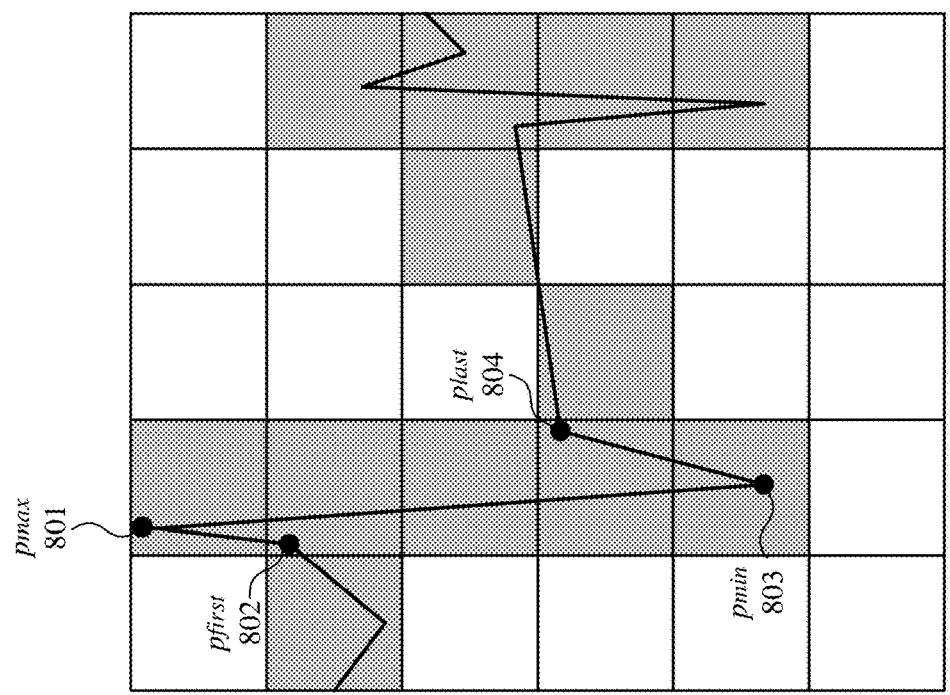
Figure 8A:
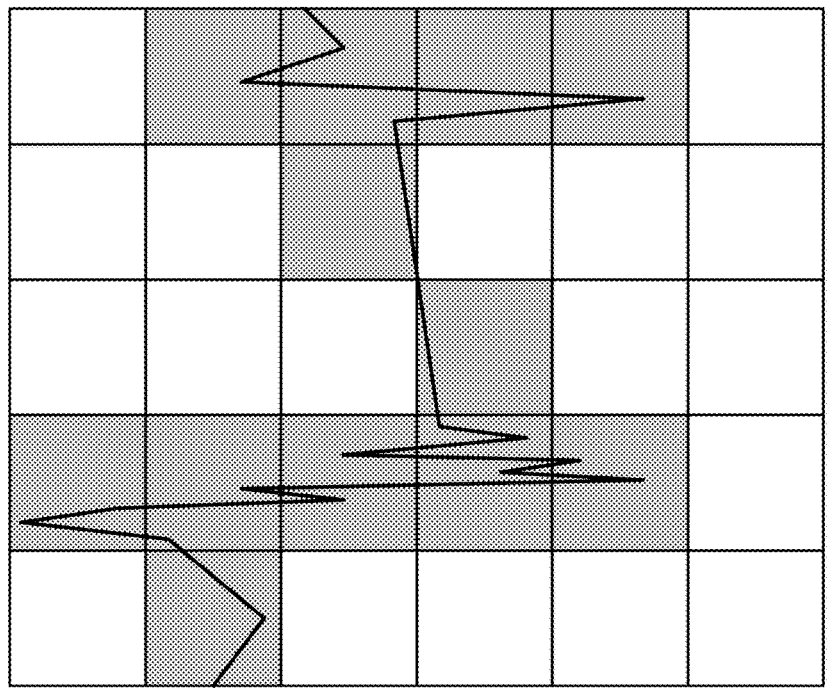

FIG. 8a shows part of a line chart (800) rendered with no data reduction operator on a query, for error-free visualization. The line chart (800) includes five pixel columns (time spans) in which tuples are organized. The leftmost pixel column includes a tuple. The next pixel column includes 10 tuples. The third and fourth pixel columns include no tuples, and the last pixel column includes four tuples. Dark lines that connect adjacent tuples show the underlying time-series relationship, but are not rendered. Instead, any pixel that includes at least one tuple or includes a line between adjacent tuples is rendered, as shown in the shaded boxes.

FIG. 8b shows part of a line chart (810) rendered after application of the M4 aggregation operator on the query. The leftmost pixel column still includes a single tuple, but the next column includes four tuples (instead of 10 tuples). The four tuples are the tuple for the first value $p_{first}$ (802), the tuple for the largest value $p_{max}$ (801), the tuple for the smallest value $p_{min}$ (803), and the tuple for the last value $p_{last}$ (804). Again, the dark lines that connect adjacent tuples are not rendered. Instead, a shaded box indicates any pixel that includes at least one tuple or includes a line between adjacent tuples, and hence is rendered. Overall, the pattern of rendered lines (shown as shaded boxes) is identical between FIGS. 8a and 8b.

In contrast, using only the tuple with the minimum value and tuple with the maximum value per group (per time span) in a line chart can result in various types of errors in visualization. That is, ignoring the tuple with the first value and tuple with the last value per group can cause visualization errors. FIG. 8c shows part of a line chart (820) rendered after application of the min-max aggregation operator on the query. The line that should connect the last tuple in group 2 to the first tuple in group 5 (see FIG. 8b) is missing in FIG. 8c. Instead, a line is drawn between the minimum value $p_{min}$ (803) of group 2 and the minimum value of group 5. This illustrates a "missing line error" (missing line from the last value of one group to the first value of another group) and a "false line error" (extra line from a value of one group to a value of another group). Missing line errors can be especially visible for time series that have heterogeneous time distribution or gaps (pixel columns with no tuples). A missing line error is often exacerbated by a false line error, since an incorrect line is still drawn across a gap. While they are especially noticeable across gaps, missing line errors and false line errors can also happen between neighboring pixel columns because inner-column lines do not always represent the complete set of pixels of a column. Another type of visualization error is an "inter-column pixel error," which involves an extra pixel or missing pixel above or below the inner-column lines for a given group (time span), where the extra pixel or missing pixel is for a line drawn between columns. In FIG. 8c, there is an extra pixel above the inner-column lines of the first column. The extra pixel includes part of the line to the tuple with the largest value $p_{max}$ (801) in the second column. For two-color (binary) line visualization, these types of visualization errors can be avoided if the tuple with the first value and tuple with the last value per group (per time span) are considered, as with the M4 aggregation operator.

Other common chart types can be derived from the base types (scatter plot, bar chart, line chart). For example, a bubble chart can be considered to be a scatter plot with varying size of mark (circle) used for a data point, depending on an additional attribute. The underlying data for a bubble chart can be represented by two aligned time-series relations. Similarly, a stacked line (or bar) chart can be modeled as a combination of two aligned line or bar charts.

B. Example Data Reduction Operators.

In some example implementations, a query rewriter can apply any of various aggregation operators when rewriting a query, depending on characteristics of a visualization client. This section details several types of aggregation operators that can be applied to produce data-reducing queries. The different aggregation operators can be applied for a group (time span) to reduce the number of tuples requested within that group (time span). Different aggregation operators may be adapted for different types of visualization and may trade off data reduction versus degree of visualization error.

1. Normal Aggregation.

One simple form of data reduction is to compute an aggregated value and an aggregated timestamp according to an aggregation function, which can be a min function (finding a minimum value), max function (finding a maximum value), avg function (finding an arithmetic mean value), median function (finding a median value), medoid function (finding a medoid value), mode function (finding the most common value), or other aggregation function. The resulting data-reducing queries on time-series relation $T(t, v)$ can be defined in relational algebra using a (horizontal) grouping function $f_g$ and two aggregation functions $f_t$ and $f_v$:

$$f_{g(t)}G_{f_t(t),f_v(v)}(T) \quad (3).$$

For example, the grouping function $f_g$ can be defined as:

$$f_g(t) = \text{round}(w \cdot (t - t_{start})/(t_{end} - t_{start})) \quad (4),$$

whereby a group is determined for a timestamp t, considering the width w of the canvas area and first and last timestamps ($t_{start}$ and $t_{end}$). According to this grouping function $f_g$, time intervals (groups) are aligned with pixel columns in order to model the process of visualization at the query level. Essentially, the grouping function $f_g$ uses a geometric transformation $x = f_x(t)$ that is applied by a visualization client during rendering, then rounds the resulting value to a discrete group key between 0 and w. For the two aggregation functions $f_t$ and $f_v$, for example, a rewritten query can select a first (earliest) timestamp in a group and select an average value, so as to model a piece-wise aggregate approximation ("PAA") of a time-series relation rendered as a line chart. Thus, different aggregation functions can be used to select the timestamp and value for a group. Alternatively, some other combination of aggregation functions (using min, max, avg, median, medoid, mode, etc.) can be used to select a timestamp and value for a group.

Although a simple aggregation function (using min, max, avg, median, medoid, mode, etc.) can significantly reduce data rate, such an aggregation function may also cause distortion in the shape of the time-series relation when rendered, compared to a visualization of the original time-series relation. To preserve the shape of the time-series relation, additional extreme points within the respective groups (time spans) can be considered, as explained below.

2. Value-Preserving Aggregation.

To select corresponding tuples based on aggregated values (computed as described in the previous section), the query rewriter adjusts the query to join the aggregated data with the underlying time-series data $T(t, v)$. The query rewriter replaces one of the aggregation functions with the time-based group key (result of the grouping function $f_g$) and joins the aggregation results with $T(t, v)$ on that group key and on the aggregated value or timestamp. For example, the following query selects corresponding timestamps t for each aggregated value $v_g = f_v(v)$.

$$\pi_{t,v}(T \triangleright\!\triangleleft_{f_g(t)=k \wedge v=v_g}(f_{g(t)}G_{k \leftarrow f_g(t),v_g \leftarrow f_v(v)}(T))) \quad (5).$$

Or, as another example, the following query selects the corresponding values v for each aggregated timestamp $t_g = f_t(t)$.

$$\pi_{t,v}(T \triangleright\!\triangleleft_{f_g(t)=k \wedge t=t_g}(f_{g(t)}G_{k \leftarrow f_g(t),t_g \leftarrow f_t(t)}(T))) \quad (6).$$

These queries may select more than one tuple per group, if there are duplicate values or timestamps in a group. In most high-volume time-series data sources, however, timestamps are unique, and values are real-valued numbers with multiple decimals places, such that duplicates are rare for small groups. In scenarios with significant occurrences of duplicates, the preceding two queries can be encased with additional, compensating aggregation operators to ensure appropriate data reduction rates.

3. Sampling.

Using value-preserving aggregation, the query rewriter can express simple forms of systematic sampling. For example, the first tuple (earliest timestamp) per group can be selected using the following query.

$$\pi_{t,v}(T \triangleright\!\triangleleft_{f_g(t)=k \wedge t=t_{min}}(f_{g(t)}G_{k \leftarrow f_g(t),t_{min} \leftarrow min(t)}(T))) \quad (7).$$

Or, the last tuple (latest timestamp) per group can be selected using the following query.

$$\pi_{t,v}(T \triangleright\!\triangleleft_{f_g(t)=k \wedge t=t_{max}}(f_{g(t)}G_{k \leftarrow f_g(t),t_{max} \leftarrow max(t)}(T))) \quad (8).$$

Or, the tuple with the smallest value per group can be selected using the following query.

$$\pi_{t,v}(T \triangleright\!\triangleleft_{f_g(t)=k \wedge v=v_{min}}(f_{g(t)}G_{k \leftarrow f_g(t),v_{min} \leftarrow min(v)}(T))) \quad (9).$$

Or, the tuple with the largest value per group can be selected using the following query.

$$\pi_{t,v}(T \triangleright\!\triangleleft_{f_g(t)=k \wedge v=v_{max}}(f_{g(t)}G_{k \leftarrow f_g(t),v_{max} \leftarrow max(v)}(T))) \quad (10).$$

For query-level random sampling, value-preserving aggregation can be combined with the SQL 2003 concept of the TABLESAMPLE or a selection operator involving a random( ) function. This facilitates data sampling inside a database but may be inappropriate for line chart visualization.

4. Examples of Min-Max and Other Composite Aggregation.

The preceding queries (5)-(10) yield a single aggregated value per group (not counting possible duplicates). The query rewriter can also use a composite query that requests several aggregated values per group (e.g., minimum value and maximum value per group, or the minimum value, maximum value, first value and last value per group). In relational algebra, a composite query can be modeled as a union of two or more aggregating sub-queries (e.g., to determine a minimum value per group, maximum value per group, first timestamp per group or last timestamp per group) that use the same grouping function. Or, the query rewriter can modify one of the queries (5) and (6) to select multiple aggregated values or timestamps per group before joining again with the base relation. The query rewriter then adjusts the query to combine the join predicates, such that all different aggregated values or time stamps are correlated to either their missing timestamp or their missing value.

For example, a composite query can use min-max aggregation according to which the composite query selects the group-wise vertical extreme tuples—the tuple with the minimum value per group and the tuple with the maximum value per group. FIG. 9a shows an example SQL query (901) for min-max aggregation using a composite, value-preserving aggregation operator. The query (901) projects existing timestamps and values from a time-series relation Q, after joining it with the aggregation results QA. Q can be defined by any original query. For example, Q is defined as shown in the first two lines of FIG. 9d. The group keys k are based on the rounded results of the (horizontal) geometric transformation of Q to the visualization's coordinate system. This geometric transformation is the same transformation as the geometric transformation conducted by the visualization client before passing rescaled time-series data to line drawing routines for rasterization. Finally, the join of QA with Q is based on the group key k and on matching the values v in Q either with v_min or v_max from QA. A visualization of the results of the query (901) closely matches a visualization of the results of the original query, but may include missing line errors, false line errors and inter-column pixel errors, as explained above with reference to FIGS. 8a and 8b.

4. Examples of M4 Aggregation.

The min-max aggregation operator ignores the first and last tuples of a given group. In contrast, with the M4 aggregation operator, a query rewriter adjusts the query to select the first and last tuples of the group (that is, the tuple $(\min(t), v_{\mathit{first}})$ and the tuple $(\max(t), v_{\mathit{last}})$), in addition to the tuples with the smallest value and largest value of the group (that is, the tuple $(t_{\mathit{bottom}}, \min(v))$ and the tuple $(t_{\mathit{top}}, \max(v))$). M4 is a composite value-preserving aggregation that groups a time-series relation into w equidistant time spans, such that each group exactly corresponds to a pixel column in the visualization. For each group, the query rewriter adjusts a query so that it requests the aggregates min(v), max(v), min(t), and max(t), and then joins the aggregated data with the original time series, so as to add the missing timestamps $t_{\mathit{bottom}}$ and $t_{\mathit{top}}$ and the missing values $v_{\mathit{first}}$ and $v_{\mathit{last}}$.

FIG. 9b shows an example SQL query (902) for M4 aggregation using a composite, value-preserving aggregation operator. This SQL query (902) is very similar to the min-max aggregation query (901) in FIG. 9a, adding only the min(t) and max(t) aggregations and the additional join predicates based on the first and last timestamps t_min and t_max. A visualization of the results of the M4 aggregation query (902) exactly matches a visualization of the results of the original, non-reducing query.

5. Examples of Combining Operators for Different Visualizations.

In some example implementations, a visualization client may concurrently render two or more types of visualizations. For example, the visualization client may render points of a scatter plot over a line chart for a time-series relation. In this case, a user can hover a cursor over geometric primitives for the line chart to inspect information about the underlying set of query results.

When different types of visualization are combined, aggregation operators can be combined. FIG. 9c shows an example SQL query (903) that jointly requests tuples for G2D aggregation (for scatter plot visualization) and M4 aggregation (for line chart visualization). This facilitates rendering pixel-perfect line charts and inspection of the underlying data, while fetching at most $n_{\mathit{max}} = w \times (h+4)$ tuples from a data source. The query (903) is a union of a G2D query and an M4 query. To define a grouping in 2D space, the G2D query scales time t and value v from the original time-series relation Q to the visualization's coordinate system, and then rounds the rescaled real-valued data to discrete pixels. The M4 query computes the four extreme tuples and a horizontal group key k per group. The result QA is joined with the original time series Q on the group key and the corresponding aggregated timestamps and values. From the result of this equi-join, the M4 query projects the matched tuples (t, v). The final result contains up to w×h average tuples from the G2D aggregation and up to 4×w extreme tuples from the M4 aggregation.

6. Examples of Selectively Rewriting a Query.

In some example implementations, a query rewriter intercepts queries that are used for scatter plots, line charts, bar charts, and other types of visualization derivable from these three base types. The query rewriter selectively applies data-reducing rewriting to an initial query if that initial query would yield a high-cardinality result. For example, the query rewriter analyzes the initial query to assess the size of the set of query results of the initial query (e.g., using EXPLAIN functionality provided by a DBMS). If the initial query would produce a result set larger than a threshold size, the query rewriter wraps the initial query with an appropriate data reduction operator. Internally, the actual query is not changed. Then, either the initial query or the new data-reducing query is executed. With this approach, the set of query results has a relatively predictable cardinality (at most the threshold size) and bandwidth requirements. An element of the user interface can indicate whether the initial query or data-reducing query is executed.

FIG. 9d shows an example SQL query (904) for selective query rewriting for visualization of a line chart using M4 aggregation. The selective SQL query (904) is based on a width of w pixels and a cardinality limit of 4×w tuples. For conditional execution, the query (904) uses a union of two different sub-queries having contradictory predicates based on the cardinality limit. This allows the query logic to be executed only once—the execution of the initial query and the data-reducing query are covered by the single rewritten query (904).

VI. Alternatives and Variations.

In many of the examples described herein, a query rewriter processes a query for time-series data. More generally, the query rewriting and visualization techniques described herein can be applied for any relation with at least two numeric attributes that can be projected to a model of a series of tuples.

In many of the examples described herein, when a visualization client maps time-series data to a canvas area, the visualization client groups time ranges along a horizontal axis and groups value ranges along a vertical axis. As such, for visualizations such as line charts, the query rewriter organizes a query by groups of time spans and requests a set of tuples per column, where a column can have a width of a single pixel or multiple pixels. Alternatively, when a visualization client maps time-series data to a canvas area, the visualization client can group time ranges along a vertical axis and group value ranges along a horizontal axis. As such, for visualizations such as line charts, the query rewriter can organize a query by groups of time spans and requests a set of tuples per row, where a row can have a height of a single pixel or multiple pixels.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing system, a method comprising:
receiving from a visualization client an initial database query specified in a database query language, the initial database query comprising one or more commands specifying one or more query operations to be performed on a database system, including operations to select one or more data sources for a query, operations to select one or more attributes of the one or more data sources, and one or more data retrieval criteria for the one or more attributes;
receiving one or more visualization parameters for a visualization client, the one or more visualization parameters specifying a visualization type, wherein the visualization type comprises at least one of, or a visualization type derivable from, a line chart, a bar chart, a space-filling visualization, or a scatter plot that is to be rendered for display using at least a portion of query results returned in response to a query based at least in part on the initial database query;
automatically selecting a data-reduction method based at least in part on the visualization type, wherein data-reduction methods differ for at least a portion of possible visualization types;
rewriting at least part of the initial database query based at least in part on the visualization type and using the selected data-reduction method, so as to produce a data-reducing database query, the data-reducing database query being in the database query language and comprising at least a portion of the one or more commands of the initial database query and one or more data reduction operators of the database query language added by a query rewriter; and
outputting the data-reducing database query to the database system for execution, execution results of the data-reducing database query being returned by the database system to the visualization client to be rendered in the visualization type specified by the one or more visualization parameters.

2. The method of claim 1, wherein the one or more visualization parameters comprise one or more of a parameter directly specifying a width for at least a portion of a visualization, a parameter directly specifying a height for at least a portion of a visualization, and a parameter directly specifying a type of at least a portion of a visualization.

3. The method of claim 1, wherein the initial database query comprises query terms and the rewriting comprises adding to the initial database query an aggregation operator query term to reduce data requested with the initial database query, for at least one group of pixels in a visualization comprising a plurality of pixel groups, the aggregation operator selecting a first plurality of tuples from a group of a second plurality of tuples, the selected first plurality of tuples to be used for visualization of a result set at the visualization client.

4. The method of claim 3 wherein the aggregation operator query term is selected from the group consisting of an averaging aggregation operator, a min-max aggregation operator, and a min-max-last-first aggregation operator.

5. The method of claim 1, wherein the rewriting comprises:
determining columns or rows for a canvas area; and
adjusting the initial database query to include a query term requesting a set of tuples per column or row for the canvas area;
wherein the data-reducing database query includes a query term requesting tuples for time-series data to be rendered in a line chart, and wherein the set of tuples per column or row is (1) a tuple having a maximum value in a range associated with the column or row, (2) a tuple having a minimum value in the range, (3) a tuple having a first timestamp in the range, and (4) a tuple having a last timestamp in the range.

6. The method of claim 1, wherein the rewriting comprises:
determining columns or rows for a canvas area; and
adjusting the initial database query to include a query term requesting a set of tuples per column or row for the canvas area;
wherein the data-reducing database query includes a query term requesting tuples for time-series data to be rendered in a bar chart, and wherein the set of tuples per column or row is a tuple having a maximum value in a range associated with the column or row.

7. The method of claim 1, further comprising:
calculating a size of a result set for the initial database query;
comparing the size of the result set for the initial database query to a size limit, wherein the initial database query is re-written if the size of the result set for the initial database query exceeds the size limit.

8. The method of claim 1, wherein the visualization type is received separately from the initial database query.

9. The method of claim 1, wherein the data-reducing database query comprises query terms of the initial database query and one or more additional terms specified in the database query language.

10. The method of claim 1, wherein the data-reducing database query comprises a cardinality check and a workload query that uses a data-reducing subquery in addition to the initial database query if an outcome of the cardinality check satisfies a threshold.

11. The method of claim 1, wherein the one or more visualization parameters comprise one or more visualization parameters for a first visualization type and one or more visualization parameters for a second visualization type, and the data-reducing database query includes terms specified in the database query language for the one or more visualization parameters of the first visualization type and the one or more visualization parameters of the second visualization type.

12. The method of claim 1, wherein the data-reducing database query comprises contradictory predicates in a query language based on a size limit for query execution results.

13. The method of claim 1, further comprising:
determining one or more rewriting types to be applied to the initial database query, the rewriting types comprising a size of query execution results, display characteristics for the visualization client, and a type of the visualization; and
rewriting the initial database query based at least in part on the determined one or more rewriting types.

14. The method of claim 1, wherein at least one of the one or more visualization parameters is associated with a canvas, the canvas being a subset of a visualization area associated with a visualization of the visualization client.

15. The method of claim 1, wherein the one or more visualization parameters specify a plurality of different visualization types, and the automatically selecting and the rewriting are carried out concurrently for the plurality of different visualization types.

16. The method of claim 1, wherein:
a data-reduction method for a scatter plot comprises adjusting the initial database query to select at least one data point per pixel, where a pixel represents a value or range of values at a given timestamp or range of timestamps; and
a data-reduction method for a bar chart comprises grouping timestamps into w groups, where w is the width of a canvas.

17. The method of claim 16, wherein the width of the canvas is provided as a visualization parameter of the one or more visualization parameters.

18. The method of claim 16, wherein a data-reduction method for a line chart comprises adjusting the initial database query to include a M4 aggregation operator.

19. One or more non-transitory computer-readable media storing computer-executable instructions for causing a computing system programmed thereby to perform a method comprising:
receiving from a visualization client an initial database query specified in a database query language comprising a plurality of defined commands that can be executed by a database system to execute queries, the initial database query comprising one or more statements in the database query language specifying one or more query operations to be performed on the database system, the operations being selected from one or more of operations to select one or more data sources for a query, operations to select one or more attributes of the one or more data sources, and one or more data retrieval criteria for the one or more attributes;
receiving one or more visualization parameters for a visualization client, the one or more visualization parameters specifying a visualization type, wherein the visualization type comprises at least one of, or a visualization type derivable from, a line chart, a bar chart, a space-filling visualization, or a scatter plot, that is to be rendered for display using at least a portion of query results returned in response to a query based at least in part on the initial database query;
automatically selecting a data-reduction method based at least in part on the visualization type, wherein data-reduction methods differ for at least a portion of possible visualization types;
rewriting at least part of the initial database query based at least in part on the visualization type and using the selected data-reduction method, so as to produce a data-reducing database query, the data-reducing database query being in the database query language and comprising at least a portion of the one or more statements of the initial database query and one or more aggregation operators of the database query language added by a query rewriter; and
outputting the data-reducing database query to the database system for execution, execution of the data-reducing database query being returned by the database system to be sent to the visualization client, wherein the visualization client renders query results in the visualization type specified by the one or more visualization parameters.

20. A computing system that implements a query rewriting tool, the computing system comprising at least one memory and at least one processor coupled to the at least one memory, the at least one memory storing computer-executable instructions for performing operations comprising:
receiving an initial database query specified in a structured database query language, the initial database query comprising one or more commands in the structured database query language to perform one or more query operations to be performed on a database system, including operations for selecting one or more data sources, selecting particular data attributes of the selected one or more data sources, and one or more data retrieval criteria for the one or more data attributes;
receiving one or more visualization parameters for a visualization client, the one or more visualization parameters specifying a visualization type, wherein the visualization type comprises at least one of a chart or a graph, that is to be rendered for display using at least a portion of query results returned in response to a query based at least in part on the initial database query, wherein the one or more visualization parameters are not specified in the initial database query;
computing a size of results of the initial database query;
comparing the size to a threshold;
determining that the threshold is exceeded;
automatically selecting a data-reduction method based at least in part on the visualization type, wherein data-reduction methods differ for at least a portion of possible visualization types;
based on the determining, rewriting at least part of the initial database query based at least in part on the visualization type and using the selected data-reduction method, so as to produce a data-reducing database query, the data-reducing database query being in the structured database query language and comprising at least a portion of the one or more commands and one or more data reduction operators of the structured database query language added by a query rewriter, wherein the initial database query is not rewritten if the threshold is not exceeded; and
outputting the data-reducing database query to the database system for execution, execution of the data-reducing database query being returned by the database system to the visualization client to be rendered in the visualization type specified by the one or more visualization parameters.

* * * * *